(12) United States Patent
Tamura et al.

(10) Patent No.: US 8,775,801 B2
(45) Date of Patent: Jul. 8, 2014

(54) RADIO COMMUNICATION APPARATUS AND RADIO COMMUNICATION METHOD

(75) Inventors: Toshiya Tamura, Kokubunji (JP); Shigeo Terabe, Hachioji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 815 days.

(21) Appl. No.: 12/726,494

(22) Filed: Mar. 18, 2010

(65) Prior Publication Data
US 2010/0319055 A1 Dec. 16, 2010

(30) Foreign Application Priority Data

Jun. 12, 2009 (JP) ................................. 2009-141507
Jun. 12, 2009 (JP) ................................. 2009-141508
Jun. 15, 2009 (JP) ................................. 2009-142423

(51) Int. Cl.
H04L 9/32 (2006.01)

(52) U.S. Cl.
USPC ............... 713/166; 726/4; 380/270; 455/410; 455/411; 455/421; 370/392

(58) Field of Classification Search
USPC ............... 726/4; 380/270; 455/410–411, 421; 370/392; 713/166
See application file for complete search history.

(56) References Cited

U.S. PATENT DOCUMENTS

| | | | |
|---|---|---|---|
| 7,269,260 B2 * | 9/2007 | Adachi et al. | 380/270 |
| 7,356,308 B2 * | 4/2008 | Hamada et al. | 455/421 |
| 7,689,169 B2 | 3/2010 | Lee et al. | |
| 7,716,475 B2 | 5/2010 | Asai et al. | |
| 2006/0090200 A1 | 4/2006 | Oie | |

FOREIGN PATENT DOCUMENTS

| | | |
|---|---|---|
| JP | 2005-318298 A | 11/2005 |
| JP | 2006-191569 A | 7/2006 |
| JP | 2007-068035 A | 3/2007 |
| JP | 2009-060526 A | 3/2009 |
| WO | 03/085528 A1 | 10/2003 |

OTHER PUBLICATIONS

Bluetooth Specification Version 2.1 & EDR; Bluetooth SIG; Jul. 26, 2007.
Bluetooth Specification Version 2.0 & EDR: Bluetooth SIG; Nov. 4, 2004.
JP Office Action mailed on Oct. 16, 2012 in application No. 2009-142423.
JP Office Action dated Apr. 23, 2013 in application No. 2009-141508.
JP Office Action mailed on Mar. 12, 2013 in application No. 2009-141507.

* cited by examiner

*Primary Examiner* — Thanhnga B Truong
(74) *Attorney, Agent, or Firm* — Maschoff Brennan (57) ABSTRACT

A radio communication apparatus executes communication by establishing a communication link according to a security level with other device. The radio communication apparatus sets a security level according to a type of service, and discriminates whether the security level is necessary for the communication with the other device. If the security level is necessary, the communication link according to the security level is established. If the security level is not necessary, security level is lowered and the communication link according to the lowered security level is established.

8 Claims, 9 Drawing Sheets

RADIO COMMUNICATION APPARATUS AND RADIO COMMUNICATION METHOD

CROSS-REFERENCE TO RELATED APPLICATIONS

This application is based upon and claims the benefit of priority from prior Japanese Patent Applications No. 2009-141507, filed Jun. 12, 2009; No. 2009-141508, filed Jun. 12, 2009; and No. 2009-142423, filed Jun. 15, 2009, the entire contents of all of which are incorporated herein by reference.

BACKGROUND

1. Field

The present invention relates to a radio communication apparatus executing radio communications accompanying authentication procedure of, for example, Bluetooth®, etc.

2. Description of the Related Art

In Bluetooth Core Specification version 2.1+EDR, a new connection authentication procedure called Secure Simple Pairing (hereinafter abbreviated as SSP) is defined. The SSP has two objects. One of the objects is to improve usability by simplifying the authentication procedure. The other object is to improve security by introducing a public key encryption system and reinforcing resistance to passive eavesdropping and man-in-the-middle or active eavesdropping.

Next, a procedure for authentication between Device A and Device B will be explained. A shape of Device A enables the device to display numbers and to input numbers and Yes/No. Device B has any shape (the authentication processing is classified according to the shape of Device B).

The conventional authentication procedure (Bluetooth Core Specification version 2.0+EDR) has urged a user to input, for example, a common decimal four-digit PIN number to each of Device A and Device B, in order to prevent active eavesdropping by checking whether both the numbers match, and concealed a link key by creating a link key from the PIN numbers input by the user, in order to prevent passive eavesdropping.

If the shape of Device A enables the device to display numbers and to input numbers and Yes/No while Device B cannot input numbers due to a reason for the device shape, the user can maintain the security level by describing the PIN number preliminarily in a manual, etc. of Device B and inputting the PIN number in Device A.

In these methods, however, there are problems on the usability and security. From the viewpoint of usability, there is a problem that if the user finds it troublesome to input the four-digit number to both the devices or uses the fixed PIN number, the user can hardly maintain the number. From the viewpoint of security, there is a problem that since there are at most 9,999 candidates for the link key, the link key may be identified by total check.

In SSP (Bluetooth core Specification version 2.1+EDR, Version 2.1 or later), the resistance to passive eavesdropping is improved and the security performance is enhanced by applying the public key encryption system to the link key creation to solve the above problem.

SUMMARY

One aspect of the present invention is a radio communication apparatus for executing communication by establishing a communication link according to a security level with other device, the apparatus comprising: a setting unit configured to set a security level according to a type of service; a discriminating unit configured to discriminate whether the security level set by the setting unit is necessary for the communication with the other device, in accordance with the type of the other device; a first link establishing unit configured to establish the communication link according to the security level set by the setting unit, with the other device, if the discriminating unit discriminates that the security level is necessary; and a second link establishing unit configured to lower the security level set by the setting unit and to establish the communication link according to the security level with the other device, if the discriminating unit discriminates that the security level is unnecessary.

Another aspect of the present invention is a radio communication apparatus for executing communication by establishing a communication link according to a security level with other device, the apparatus comprising: an authenticating unit configured to execute authentication according to the security level set by the other device; a discriminating unit configured to discriminate whether user authentication is necessary or not, in accordance with a type of the other device, if the authentication executed by the authenticating unit is not authentication including confirmation executed by the user; and a link establishing unit configured to establish the communication link with the other device if the discriminating unit discriminates that the user authentication is unnecessary, and accept a direction to permit connection with the other device from the user and to establish the communication link with the other device if the discriminating unit discriminates that the user authentication is necessary.

The other aspect of the present invention is a radio communication apparatus comprising: a near field communication unit configured to execute near field communication; and an authentication discriminating unit configured, upon receiving a request for establishment of connection using the near field communication unit from other device, to discriminate whether the other device is capable of executing an authentication procedure satisfying a security level requested by the apparatus or not, and whether the other device has been authenticated by the apparatus, and to reject a connection request from the other device if the other device is incapable of executing an authentication procedure satisfying a security level requested by the apparatus and if the other device has been unauthenticated by the apparatus.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiment A

An embodiment of the present invention will be described below with reference to the accompanying drawings. In the following descriptions, a cellular telephone comprising a Bluetooth® communication function will be exemplified as a radio communication apparatus of the present invention. The cellular telephone performs authentication by using SSP.

There are two systems of authentication procedure for SSP, i.e., authentication system A that can prevent both the passive eavesdropping and active eavesdropping and authentication system B that can prevent passive eavesdropping alone but cannot prevent active eavesdropping. Selection of the system is performed by authenticating Device B at Device A according to I/O capability of Device B preliminarily notified prior to the authentication procedure.

Active eavesdropping is that a malicious person between Device A and Device B urges Device A and Device B to discriminate success in authentication by acting as Device B for Device A and acting as Device A for Device B, to eavesdrop and falsify the communication data.

One of the examples of authentication system A is Numeric Comparison (Bluetooth Core Specification version 2.1+EDR).

In the Numeric Comparison, the active eavesdropping is prevented by making the user recognize that the connected device is an intended device by a simple operation. More specifically, in both the devices, six-digit numbers are created in a determined arithmetic operation from public Keys (Public Key A, Public Key B) of both the devices during the authentication procedure. The user visually recognizes that the same number is displayed on both the devices, and pushes down Yes button, to continue the procedure as the success in authentication. If different numbers are displayed on both the devices, the user terminates the procedure as failure in authentication by pushing down No button.

If the intervening person sends own Public key X to Device A (Device B), the numbers created from Public key A and Public key X are displayed on Device A while the numbers created from Public key B and Public key X are displayed on Device B, i.e., the created numbers do not match, the authentication is recognized as NG, and the communication security is thereby maintained.

If the intervening person wiretaps the Public key of Device B (Device A) for Device A (Device B) and transparently sends the wiretapped Public key to Device A (Device B), the same number is displayed on both the devices and the authentication executed by the active eavesdropping succeeds. However, since the intervening person does not have the secret key of Device A (Device B), the intervening person cannot create a link key or cannot execute wiretapping or falsification by active eavesdropping. In other words, in this case, too, the security of communication is maintained.

Thus, in the Numeric Comparison, the active eavesdropping is prevented by incorporating the user's confirmation procedure into a part of the authentication procedure.

Just Works is an example of authentication system B. Just Works is basically the same as the authentication procedure of Numeric Comparison, but has the one difference that there is no user's confirmation procedure. Device A (Device B) automatically obtains the number created by the other device and executes comparison, and the authentication procedure is thereby continued. The resistance to active eavesdropping in Just Works is equal to that in Numeric Comparison since the public key encryption system is applied. However, the numeric comparison is automatically executed, Just Works does not have the resistance to active eavesdropping.

As explained above, since authentication system B does not require user's confirmation procedure, there is no burden on the user operation and authentication system B is superior to authentication system A in terms of the usability. On the other hand, the confirmation procedure is necessary and there is much burden on the user operation in authentication system A, but authentication system A has high security performance since active eavesdropping can be prevented in the system.

One of the authenticate systems can be selected in accordance with the I/O ability of the device. As for the I/O ability of Device B, if Device B has a shape such as a head set which does not comprise an input interface or an output interface, Device B does not comprise means for confirming the connection with a device intended by the user (for example, displaying numbers, etc.) Therefore, as long as authentication system A is based on the user confirmation, authentication system A having the resistance to active eavesdropping cannot be selected and active eavesdropping cannot be prevented by applying the system such as authentication system B, in such a case.

In this selecting method, if Device B has the I/O ability by which the user confirmation cannot be executed, Device B cannot help selecting the authentication system of a low security level irrespective of the security level of the communications.

Another method for deciding the authentication is to accept the authentication system B irrespective of the security level of the communications. However, since the user confirmation is not executed in authentication system B, authentication system B has no resistance to active eavesdropping and a low security performance. For this reason, a problem of security occurs in the communications required to be executed at a high security level.

Another method for deciding the authentication is to prevent a risk of connecting to an intended intervening person by rejecting the authentication request from Device B which does not comprise an input interface or an output interface. In this method, only the authentication system A is executed, therefore the high security level is maintained. However, there is a problem that connectivity between the devices is lowered. For example, if Device B is a headset which does not comprise a display or Yes/No button, Device B is mainly used for listening to music, and does not need to reject the connection even if the authentication cannot be executed at a high security level.

In this embodiment, the cellular telephone executes authentication according to the security level. The security level is set in accordance with the type of the service executed between the devices, and the type of the other device.

Therefore, the cellular telephone in this embodiment can enhance connectivity while assuring a necessary security level when the cellular telephone executes authentication by using SSP.

Figure 1:
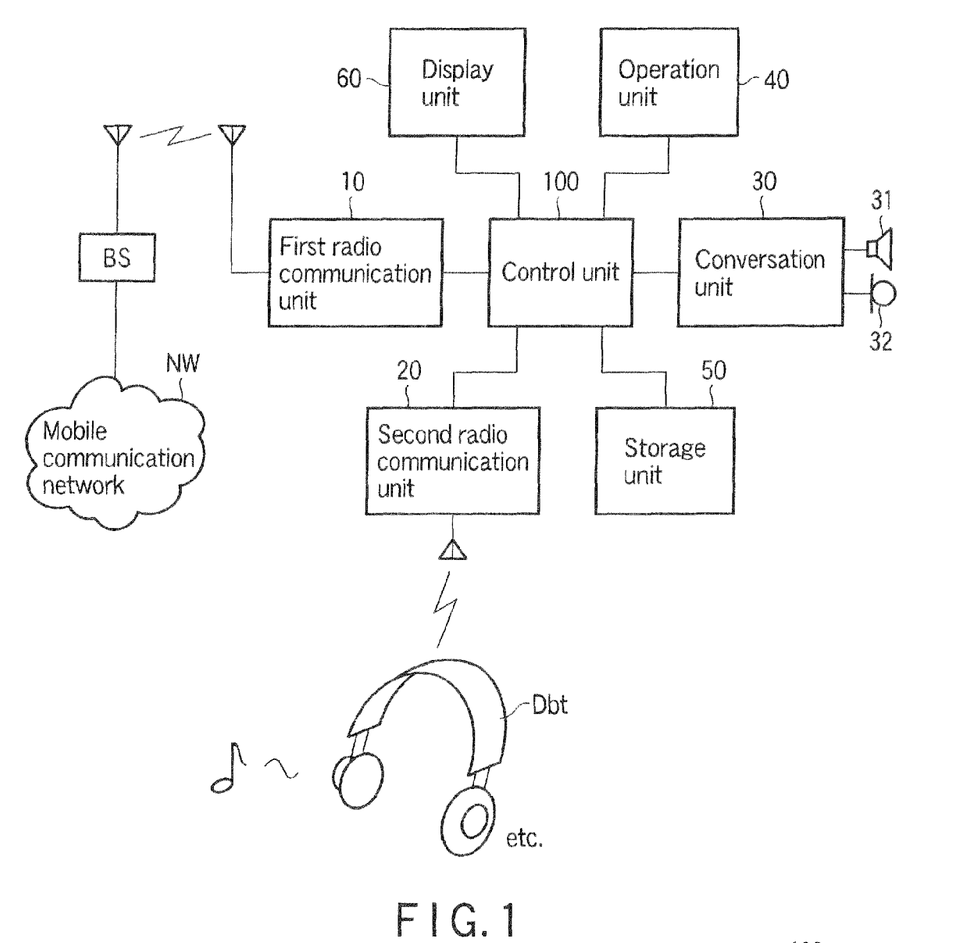
FIG. 1 is a block diagram showing a configuration of a radio communication apparatus according to an embodiment A of the present invention.

FIG. 1 is a block diagram showing a configuration of cellular telephone UE according to the embodiment. The cellular telephone UE comprises as main constituent elements thereof a control unit 100, a first radio communication unit 10, a second radio communication unit 20, a conversation unit 30, an operation unit 40, a storage unit 50 and a display unit 60, and also comprises a communication function of a cellular telephone and a Bluetooth communication function of a near field communication apparatus.

The first radio communication unit 10 executes radio communications with a base station apparatus BS accommodated in a mobile communication network NW in, for example, LTE (Long Term Evolution), in accordance with directions of the control unit 100. Translation and reception of speech data, electronic mail data, etc., and reception of Web data, streaming data, etc. are thereby executed.

The second radio communication unit 20 executes radio communications with a Bluetooth-enabled device Dbt in Bluetooth based on Bluetooth Core Specification version 2.1+EDR, in accordance with directions of the control unit 100. Transmission and reception of various types of data with the Bluetooth-enabled device Dbt are thereby executed.

The conversation unit 30 comprises a speaker 31 and a microphone 32, and converts user's speech input through the microphone 32 into speech data which can be processed in the control unit 100 and outputs the speech data to the control unit 100, and decodes speech data received from the other party of conversation through the first radio communication unit 10 or the second radio communication unit 20 and outputs the decoded speech data from the speaker 31.

The operation unit 40 comprises a plurality of key switches, etc., and accepts directions from the user by means of the key switches, etc.

The storage unit 50 stores control programs and control data of the control unit 100, application software, address data associated with names, telephone numbers, etc. of the other parties of communication, data of transmitted and received emails, web data downloaded by web browsing, and downloaded content data, and temporarily stores streaming data, etc. The storage unit 50 comprises one or more storage means such as HDD, RAM, ROM, IC memory, etc.

The display unit 60 displays images (still images and moving images), character information, etc. under control of the control unit 100 and visually transmits them to the user.

The control unit 100 comprises a microprocessor, operates under the control programs and control data stored in the storage unit 50, and controls all the units of the cellular telephone. The control unit 100 also comprises a network communication controlling function for controlling each of the units of the commutation system to execute the speech communication and data communication, a near field communication controlling function for executing communications with the Bluetooth-enabled device Dbt by controlling the operations of the second radio communication unit 20, and an application processing function for executing mail software which creates, transmits and receives electronic mails, browser software which executes web browsing, media reproduction software which downloads and reproduces streaming data, etc. and for controlling each of the units associated with the software.

Figure 8:
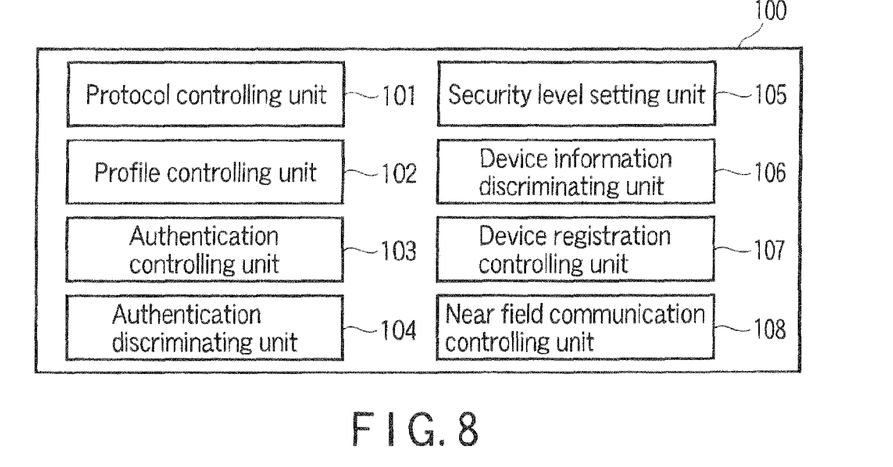
FIG. 8 is a block diagram showing a configuration concerning control of Bluetooth communications in the radio communication apparatus shown in FIG. 7.

In particular, the near field communication controlling function is based on Bluetooth Core Specification version 2.0+EDR and Bluetooth Core Specification version 2.1+EDR. As a configuration for implementing this function, the control unit 100 comprises functional blocks as shown in FIG. 8, and their control allows the second radio communication unit 20 to operate.

Figure 2:
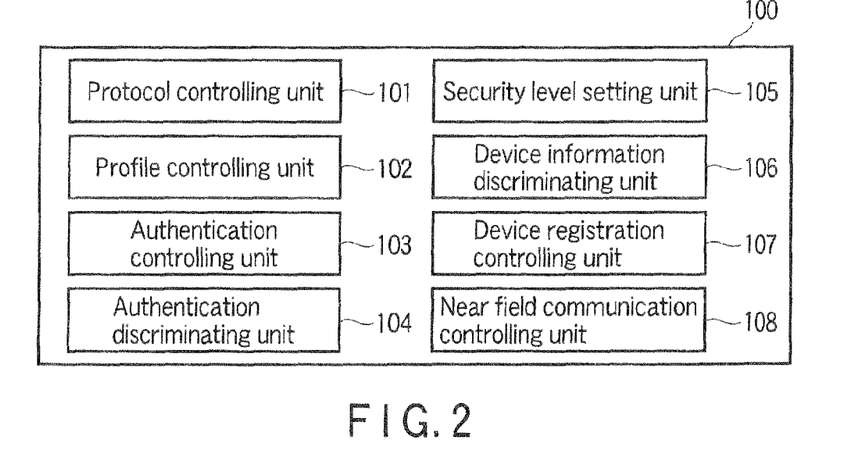
FIG. 2 is a block diagram showing a configuration concerning control of Bluetooth communications in the radio communication apparatus shown in FIG. 1.

A protocol controlling unit 101 controls the second radio communication unit 20 to execute functions provided by Bluetooth Stack from Baseband to RFCOMM.

A profile controlling unit 102 controls the second radio communication unit 20 to execute functions provided by various types of Profile such as HFP, A2DP, AVRCP, etc.

An authentication controlling unit 103 controls the second radio communication unit 20 to execute authentication procedures such as Authentication and Pairing defined under Bluetooth Core Spec such as Bluetooth Stack and Generic Access Profile.

An authentication discriminating unit 104 controls the second radio communication unit 20 to determine the security level set for each of services (Profile) to be operated and the security level authenticated in accordance with input and output abilities of the Bluetooth-enabled device Dbt, and direct the authentication controlling unit 103 to execute authentication processing.

A security level setting unit 105 controls the second radio communication unit 20 to manage a security level set for each of services (Profile) and notify the authentication discriminating unit 104 of a security level to be selected, in response to an inquiry from the authentication discriminating unit 104 at the time of the authentication processing.

A device information discriminating unit 106 controls the second radio communication unit 20 to obtain device information (CoD, Class of Device) of the Bluetooth-enabled device Dbt and discriminate the service (Profile) supported by the Bluetooth-enabled device Dbt.

A device registration controlling unit 107 controls the second radio communication unit 20 to create a key for authentication of the Bluetooth-enabled device Dbt and hold the key in association with a device address.

A near field communication controlling unit 108 controls the second radio communication unit 20 to control Baseband of the Bluetooth communications.

The Bluetooth-enabled device Dbt comprises functional blocks as shown in FIG. 2 at a control unit thereof, and also comprises a radio communication unit for executing Bluetooth communications equivalent to those of the second radio communication unit 20.

Figure 3:
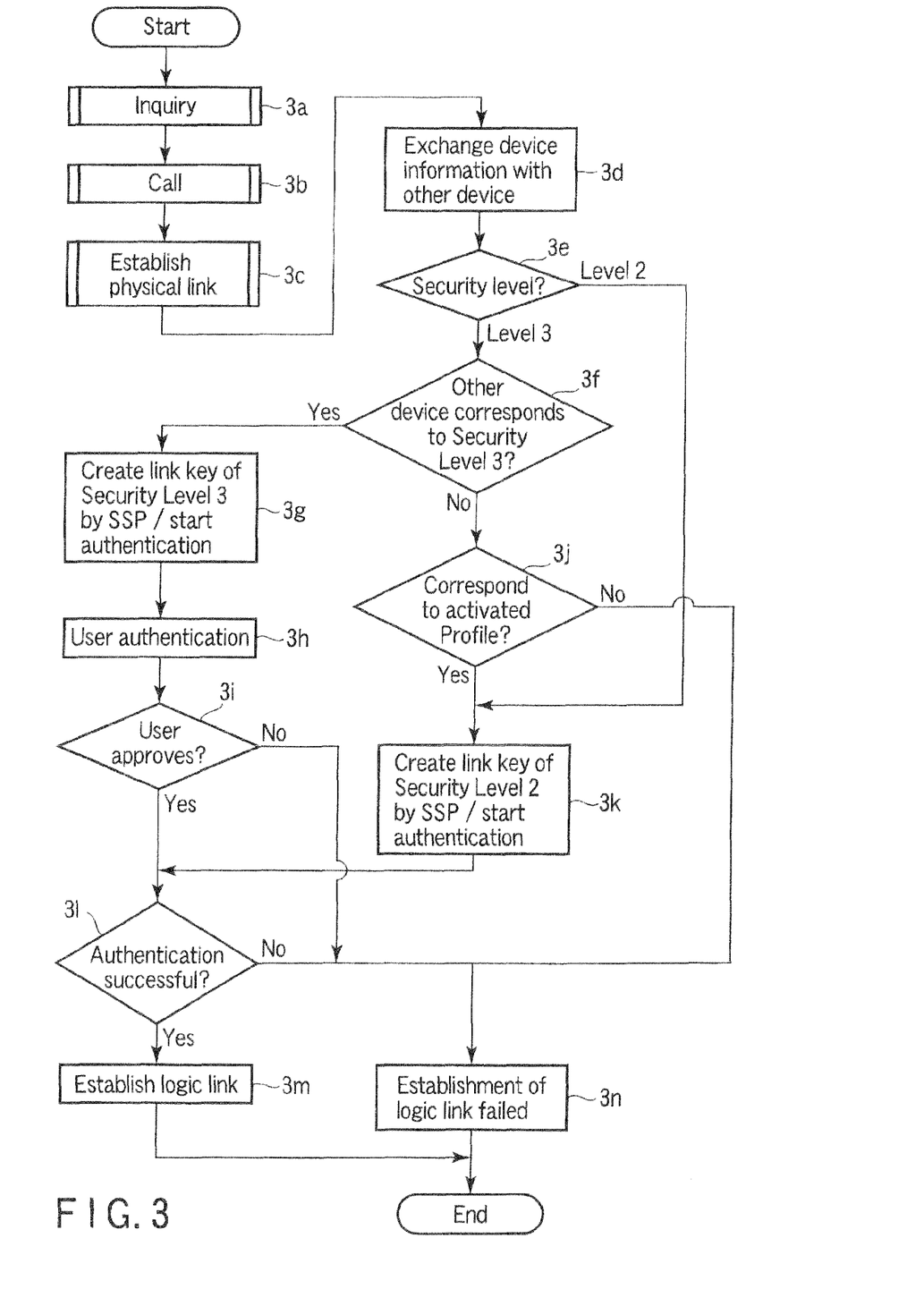
FIG. 3 is a flowchart showing the control of Bluetooth communications in the radio communication apparatus shown in FIG. 1.

Next, operations of the cellular telephone UE having the above-described configuration will be described. The following descriptions are focused on processing of connecting to the Bluetooth-enabled device Dbt as led by the cellular telephone UE. A flowchart of the connection processing is shown in FIG. 3. The connection processing is executed by the control unit 100, and is started when the user requires execution of the application software requiring radio communications with the Bluetooth-enabled device Dbt, by means of the operation unit 40.

First, in step 3a, the profile controlling unit 102 controls the second radio communication unit 20 to detect Bluetooth-enabled devices Dbt existing in the vicinity of the cellular telephone UE. Then, the processing proceeds to step 3b. More specifically, a signals transmitted from the Bluetooth-enabled devices Dbt existing in the vicinity of the cellular telephone UE are received, identification information (BDADDR) included in the signals is extracted, and their existence thereof is detected.

In step 3b, the control unit 100 displays a list of the Bluetooth-enabled devices Dbt detected in step 3a, on the display unit 60, and accepts selection of the other device executing Bluetooth communications by the operation unit 40. Then, the profile controlling unit 102 controls the second radio communication unit 20 to transmit a calling signal to the selected other device, and the processing proceeds to step 3c.

In step 3c, the protocol controlling unit 101 controls the second radio communication unit 20 to establish a physical link with the other device, and the processing proceeds to step 3d.

Figure 4:
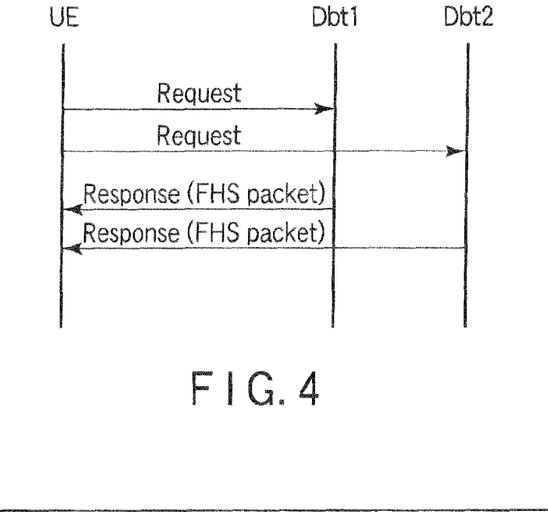
FIG. 4 is an illustration showing an inquiry sequence to a corresponding device of the radio communication apparatus shown in FIG. 1.

In step 3d, the authentication controlling unit 103 controls the second radio communication unit 20 to make a request for the other device called in step 3b as shown in FIG. 4, over the physical link established in step 3c, and obtain device information and I/O ability information in accordance with the response from the other device. The processing proceeds to step 3e.

Figure 5:
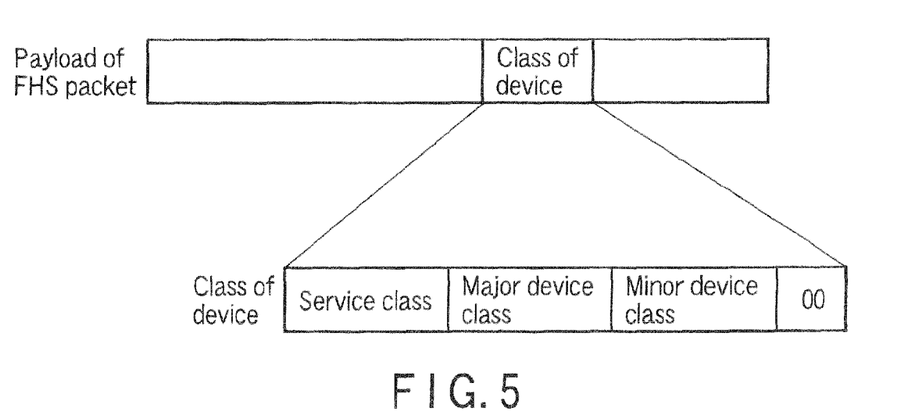
FIG. 5 is an illustration showing a structure of FHS packet.
Figure 6:
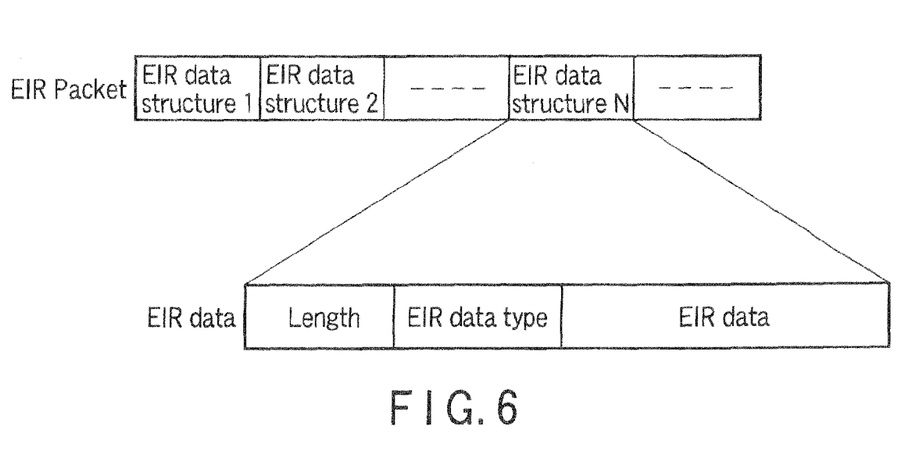
FIG. 6 is an illustration showing a structure of EIR packet.

The device information and ability information of the I/O device of the cellular telephone UE are also transmitted to the other device to exchange mutual information though not shown in FIG. 4. These information items are exchanged through FHS packet. FIG. 5 shows payload of the FHS packet. As shown in this figure, the FHS packet includes fields called Class of device. This field is further separated into some subfields, and the Class of device is defined by them.

The subfields indicate a service class, a major device class, and a minor device class. In the service class, service categories such as audio, object transmission, network, etc. are defined. In the device class, types of devices according to the respective service classes, such as computer, cellular telephone, audio, etc. are further defined. The details are represented in Bluetooth Core Specification version 2.1+EDR.

In step 3e, the authentication discriminating unit 104 makes inquiry of the security level to the security level setting unit 105, and discriminates the security level notified by the response. If the necessary security level is 3, the processing proceeds to step 3f. If the necessary security level is 2, the processing proceeds to step 3i.

On the basis of the device information (including the types of services) obtained in step 3d, for example, the security level setting unit 105 discriminates that high Security Level 3 is necessary and sets the security level, for a device which uses a service causing billing, a device which uses a service accompanying outgoing calls or a device which uses a service accessing the user information. On the other hand, the security level setting unit 105 discriminates that low Security Level 2 is necessary and sets the security level, for a device which uses the other services (listening to music, etc.) At high Security Level 3, authentication in the authentication system accompanying the user confirmation is necessary. At low Security Level 2, authentication in the authentication system which does not accompany the user confirmation can be executed.

In step 3f, the authentication discriminating unit 104 refers to the I/O ability information obtained in step 3d by the authentication controlling unit 103 and discriminates whether the other device corresponds to Security Level 3. If the other device corresponds to Security Level 3, the processing proceeds to step 3g. If the other device does not correspond to Security Level 3, the processing proceeds to step 3j.

More specifically, if the I/O ability information is NoInputNoOutput, i.e., does not comprise input means (buttons and keys) or display means (display), the authentication discriminating unit 104 discriminates that the other device cannot correspond to Security Level 3. In the other cases, the authentication discriminating unit 104 discriminates that the other device can correspond to Security Level 3.

In step 3g, the authentication discriminating unit 104 gives a direction to the authentication controlling unit 103. The authentication controlling unit 103 thereby creates a link key of Security Level 3 by the SSP and starts the authentication. Then, the authentication discriminating unit 104 controls the second radio communication unit 20 to transmit the link key to the other device and receive a link key created similarly at the other device. The processing proceeds to step 3h.

In step 3h, the authentication controlling unit 103 creates a number for the user authentication in, for example, Numeric Comparison. In other words, the authentication controlling unit 103 reads the public key of the cellular telephone UE stored in the storage unit 50, and controls the second radio communication unit 20 to transmit the public key to the other device and obtain a public key of the other device from the other device. The authentication controlling unit 103 executes a predetermined operation based on both the public keys, creates a number, and displays the created number on the display unit 60. The processing proceeds to step 3i. At the other device, too, the same processing is executed, and the same number is displayed with the same two public keys.

In step 3i, the authentication controlling unit 103 discriminates whether the user has executed the approved operation by the operation unit 40 or not. The user confirms whether the number displayed on the display unit 60 matches the number displayed on the display unit of the other device or not, and operates the operation unit 40 corresponding to the result of the matching. If the user executes the approved operation, the processing proceeds to step 3l. If the user executes a disapproved operation or if the user does not execute the approved operation for a predetermined time period or longer, the processing proceeds to step 3n.

Thus, if authentication is executed at high Security Level 3, both the cellular telephone UE and the other device execute the authentication accompanying the user confirmation.

In step 3j, the authentication discriminating unit 104 refers to the device information obtained in step 3d by the authentication controlling unit 103 and discriminates whether the other device supports the Bluetooth profile which is going to be activated or not, i.e., whether the other device executes the communication requiring high Security Level 3 or not. If the other device corresponds to the profile (i.e., the other device executes the communication not requiring high Security Level 3), the processing proceeds to step 3k. If the other device does not correspond to the profile (i.e., the other device executes the communication requiring high Security Level 3), the processing proceeds to step 3n.

For example, if the A2DP (profile to transmit audio data) Bluetooth profile is going to be activated, the authentication discriminating unit 104 confirms whether a category to support A2DP, i.e., "Audio/Video" is included in the major device class included in Class of device received from the other device. If "Audio/Video" is included in the major device class, the authentication discriminating unit 104 discriminates that high Security Level 3 is not necessary since the other device supports A2DP. If "Audio/Video" is not included in the major device class, the authentication discriminating unit 104 discriminates that the communication requiring high Security Level 3 since the other device does not support A2DP.

In step 3k, the authentication discriminating unit 104 gives a direction to the authentication controlling unit 103, and the authentication controlling unit 103 thereby creates the link key of Security Level 2 by SSP. Then, the authentication discriminating unit 104 controls the second radio communication unit 20 to transmit the created link key to the other device and receive the link key created at the other device. The processing proceeds to step 3l. Both the cellular telephone UE and the other device execute the authentication.

In step 3l, the authentication discriminating unit 104 discriminates whether the authentication between the cellular telephone UE and the other device has been successful or not. More specifically, the authentication discriminating unit 104 discriminates whether the authentication has been successful or not, by executing collation using the link keys created in step 3g or step 3k and confirming that the link keys correspond to each other. If the authentication has been successful, the processing proceeds to step 3m. If the authentication has been failed, the processing proceeds to step 3n.

In step 3m, the authentication discriminating unit 104 controls the second radio communication unit 20 to establish a logic link. After this, communication for rendering the service is started between the other device and the second radio communication unit 20.

In step 3n, the authentication discriminating unit 104 does not establish the logic link since the authentication has been failed. The authentication discriminating unit 104 makes display indicating the failure in authentication on the display unit 60 to notify the user of the failure in authentication, and terminates the processing.

As described above, at the cellular telephone UE having the above configuration, in a case where it is discriminated in step 3e that high Security Level 3 is necessary for the communication with the Bluetooth-enabled device Dbt, if the other device cannot correspond to Security Level 3 but the type of the service implemented at the other device does not require high Security Level 3, the authentication is executed by lowering the security level to 2 and creating the link key.

Therefore, according to the cellular telephone UE, since the security level set according to the service type, etc. is reset by considering the I/O ability of the other device, the connectivity can be enhanced while maintaining the necessary security level.

In the above-described embodiment, the information items (device information and ability information) of the other device are obtained on the basis of the FHS packet, in step 3d. Instead of this, the information items can be obtained on the basis of, for example, EIR (Extended Inquiry Response) packet. Then, the discrimination of the security level setting unit 105 is executed on the basis of these information items, in step 3e.

The EIR packet is a packet transmitted from Slave (other device) to Master (cellular telephone UE) after a determined time has elapsed from the FHS packet, and includes information of more detailed service class, etc. EIR packet format is shown in FIG. 4. The details are present in Bluetooth Core Specification version 2.0+EDR.

In addition, the information indicating the type of the service used in step 3e can be obtained by executing the application selected by means of the operation unit 40 by the user and activating the Profile (service). As for the connection request activated by the action from the other service, the security level setting unit 105 may discriminate the security level on the basis of types of the action and the service to be activated.

It goes without saying that the present invention can also be variously modified within a scope which does not depart from the gist of the present invention.

Embodiment B

In the following descriptions, a cellular telephone comprising a Bluetooth communication function will be exemplified as a radio communication apparatus of the present invention. The cellular telephone performs authentication by using SSP.

As described above, if the cellular telephone and other device executes authentication each other by using SSP, the security level may be lowered depending on the I/O capability of the other device.

In this embodiment, the cellular telephone decides authentication system based on the I/O capability of the other device, and the user authentication is executed in the radio communication apparatus in accordance with the type of the other device or the type of the service even if the user authentication is not executed due to the I/O ability of the other device, etc.

Therefore, this invention can provide a radio communication apparatus and radio communication method capable of enhancing connectivity while assuring a necessary security level.

Figure 7:
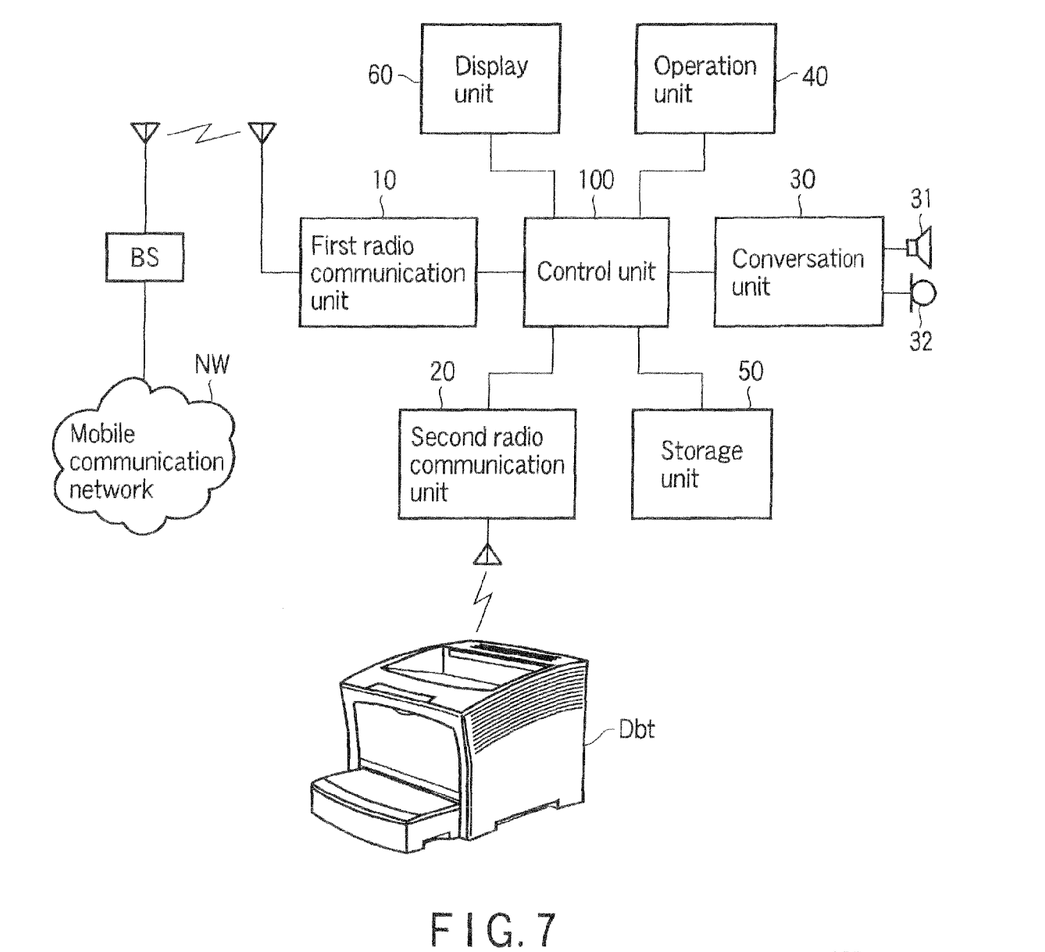
FIG. 7 is a block diagram showing a configuration of a radio communication apparatus according to an embodiment B of the present invention.

FIG. 7 is a block diagram showing a configuration of cellular telephone UE according to the embodiment of the present invention. The cellular telephone UE comprises as main constituent elements thereof a control unit 100, a first radio communication unit 10, a second radio communication unit 20, a conversation unit 30, an operation unit 40, a storage unit 50 and a display unit 60, and also comprises a communication function of a cellular telephone and a Bluetooth communication function of a near field communication apparatus.

The first radio communication unit 10 executes radio communications with a base station apparatus BS accommodated in a mobile communication network NW in, for example, LTE (Long Term Evolution), in accordance with directions of the control unit 100. Translation and reception of speech data, electronic mail data, etc., and reception of Web data, streaming data, etc. are thereby executed.

The second radio communication unit 20 executes radio communications with a Bluetooth-enabled device Dbt in Bluetooth based on Bluetooth Core Specification version 2.1+EDR, in accordance with directions of the control unit 100. Transmission and reception of various types of data with the Bluetooth-enabled device Dbt are thereby executed.

The conversation unit 30 comprises a speaker 31 and a microphone 32, and converts user's speech input through the microphone 32 into speech data which can be processed in the control unit 100 and outputs the speech data to the control unit 100, and decodes speech data received from the other party of conversation through the first radio communication unit 10 or the second radio communication unit 20 and outputs the decoded speech data from the speaker 31.

The operation unit 40 comprises a plurality of key switches, etc., and accepts directions from the user by means of the key switches, etc.

The storage unit 50 stores control programs and control data of the control unit 100, application software, address data associated with names, telephone numbers, etc. of the other parties of communication, data of transmitted and received emails, web data downloaded by web browsing, and downloaded content data, and temporarily stores streaming data, etc. The storage unit 50 comprises one or more storage means such as HDD, RAM, ROM, IC memory, etc.

The display unit 60 displays images (still images and moving images), character information, etc. under control of the control unit 100 and visually transmits them to the user.

The control unit 100 comprises a microprocessor, operates under the control programs and control data stored in the storage unit 50, and controls all the units of the cellular telephone. The control unit 100 also comprises a network communication controlling function for controlling each of the units of the commutation system to execute the speech communication and data communication, a near field communication controlling function for executing communications with the Bluetooth-enabled device Dbt by controlling the operations of the second radio communication unit 20, and an application processing function for executing mail software which creates, transmits and receives electronic mails, browser software which executes web browsing, media reproduction software which downloads and reproduces streaming data, etc. and for controlling each of the units associated with the software.

In particular, the near field communication controlling function is based on Bluetooth Core Specification version 2.0+EDR and Bluetooth Core Specification version 2.1+EDR. As a configuration for implementing this function, the control unit 100 comprises functional blocks as shown in FIG. 2, and their control allows the second radio communication unit 20 to operate.

A protocol controlling unit 101 controls the second radio communication unit 20 to execute functions provided by Bluetooth Stack from Baseband to RFCOMM.

A profile controlling unit 102 controls the second radio communication unit 20 to execute functions provided by various types of Profile such as HFP, A2DP, AVRCP, etc.

An authentication controlling unit 103 controls the second radio communication unit 20 to execute authentication procedures such as Authentication and Pairing defined under Bluetooth Core Spec such as Bluetooth Stack and Generic Access Profile.

A authentication discriminating unit 104 controls the second radio communication unit 20 to determine the security level set for each of services (Profile) to be operated and the security level authenticated in accordance with input and output abilities of the Bluetooth-enabled device Dbt, and direct the authentication controlling unit 103 to execute authentication processing.

A security level setting unit 105 controls the second radio communication unit 20 to manage a security level set for each of services (Profile) and notify the authentication discriminating unit 104 of a security level to be selected, in response to an inquiry from the authentication discriminating unit 104 at the time of the authentication processing.

A device information discriminating unit 106 controls the second radio communication unit 20 to obtain device information (CoD, Class of Device) of the Bluetooth-enabled device Dbt and discriminate the service (Profile) supported by the Bluetooth-enabled device Dbt.

A device registration controlling unit 107 controls the second radio communication unit 20 to create a key for authentication of the Bluetooth-enabled device Dbt and hold the key in association with a device address.

A near field communication controlling unit 108 controls the second radio communication unit 20 to control Baseband of the Bluetooth communications.

The Bluetooth-enabled device Dbt comprises functional blocks as shown in FIG. 8 at a control unit thereof, and also comprises a radio communication unit for executing Bluetooth communications equivalent to those of the second radio communication unit 20.

Figure 9:
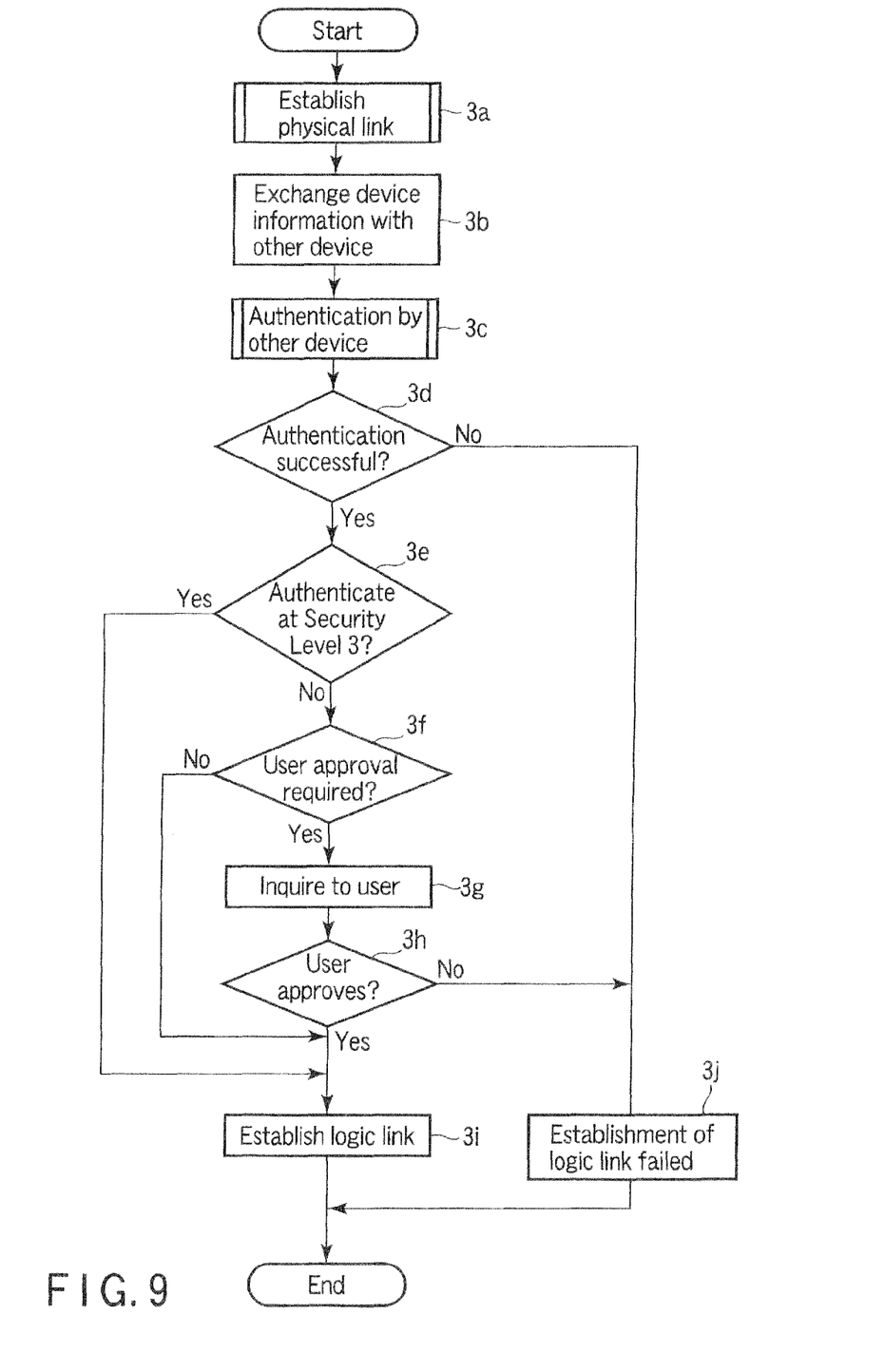
FIG. 9 is a flowchart showing the control of Bluetooth communications in the radio communication apparatus shown in FIG. 7.

Next, operations of the cellular telephone UE having the above-described configuration will be described. The following descriptions are focused on processing of connecting to the cellular telephone UE as led by the Bluetooth-enabled device Dbt serving as the other device. A flowchart of the connection processing is shown in FIG. 9. The connection processing is executed by the control unit 100, and is started when the second radio communication unit 20 receives a connection request from the Bluetooth-enabled device Dbt.

Prior to the call, the profile controlling unit 102 preliminarily controls the second radio communication unit 20 to detect the Bluetooth-enabled devices Dbt existing in the vicinity of the cellular telephone UE. More specifically, signals transmitted from the Bluetooth-enabled devices Dbt existing in the vicinity of the cellular telephone UE are received, identification information (BDADDR) included in the signals is extracted, and their existence thereof is detected.

First, in step 3*a*, the protocol controlling unit 101 controls the second radio communication unit 20 to establish a physical link with the other device. Then, the processing proceeds to step 3*b*.

In step 3*b*, the authentication controlling unit 103 controls the second radio communication unit 20 to obtain device information and I/O ability information from the other device, as shown in FIG. 4 over the physical link established in step 3*a*. The processing proceeds to step 3*c*.

The device information and ability information of the I/O device of the cellular telephone UE are also transmitted to the other device to exchange mutual information. These information items are exchanged through FHS packet.

In step 3*c*, the authentication controlling unit 103 controls the second radio communication unit 20 to execute the processing in predetermined steps, in accordance with the authentication processing executed at the other device. Then, the processing proceeds to step 3*d*.

At the other device, high Security Level 3 is discriminated necessary and is thus set for a device which uses a service causing billing, a device which uses a service accompanying origination of signals or a device which uses a service accessing the user information, and low Security Level 2 is discriminated necessary and is thus set for a device which uses the other information (listening to music, etc.), on the basis of, for example, the device information (including the types of services) obtained from the cellular telephone UE in step 3*b*.

The authentication processing of the set security level is executed between the other device and the cellular telephone UE. If the authentication succeeds, the other device transmits the information indicating the success in authentication to the cellular telephone UE. If the authentication is failed, the other device transmits the information indicating the failure in authentication to the cellular telephone UE.

In step 3*d*, the authentication controlling unit 103 controls the second radio communication unit 20 to discriminate whether the authentication processing at the other device has been successful or not, on the basis of the information received from the other device. If the authentication processing has been successful, the security level of the successful authentication is detected and then the processing proceeds to step 3*e*. If the authentication processing has been failed, the processing proceeds to step 3*m*.

In step 3*e*, the authentication discriminating unit 104 discriminates whether the successful authentication is at Security Level 3 or not, on the basis of the authentication result executed by the authentication controlling unit 103 in step 3*d*.

If the successful authentication between the cellular telephone UE and the other device is at Security Level 3, the processing proceeds to step 3*i*. If the authentication is at Security Level 3, the processing proceeds to step 3*f*.

In step 3*f*, the authentication discriminating unit 104, considering the device information obtained by the authentication controlling unit 103 in step 3*b* and the service (profile) to be executed, discriminates whether user approval is necessary or not, by confirming whether the other device corresponds to the profile to be activated or not. If the user approval is necessary, the processing proceeds to step 3*g*. If the user approval is not necessary, the processing proceeds to step 3*i*.

For example, if the profile to be activated at a present time is A2DP (profile to transmit audio data), the authentication discriminating unit 104 confirms whether a category to support A2DP, i.e., "Audio/Video" is included in the major device class of Class of device received from the other device or not. If "Audio/Video" is included in the major device class, the authentication discriminating unit 104 discriminates that the user approval is unnecessary since the other device corresponds to A2DP to be activated. If "Audio/Video" is not included in the major device class, the authentication discriminating unit 104 discriminates that the user approval is necessary since the other device does not correspond to A2DP.

In step 3*g*, the authentication controlling unit 103 makes an inquiry to the user on the display unit 60, makes display to inquire whether the user intends to connect to the other device or not, and accepts the input by means of the operation unit 40. The processing proceeds to step 3*h*.

In step 3*h*, the authentication controlling unit 103 discriminates whether the user has executed an operation of approving the connection in step 3*g* or not. If the user has approved the connection, the processing proceeds to step 3*i*. If the user has not approved the connection, the processing proceeds to step 3*j*.

In step 3*i*, the authentication discriminating unit 104 controls the second radio communication unit 20 to establish a logic link. After this, communication for rendering the service is started between the other device and the second radio communication unit 20.

In step 3*j*, the authentication discriminating unit 104 does not establish the logic link since the authentication has been failed. The authentication discriminating unit 104 makes display indicating the failure in authentication on the display unit 60 to notify the user of the failure in authentication, and terminates the processing.

In the cellular telephone UE having the above-described configuration, the Bluetooth-enabled device Dbt takes initiative in executing the authentication. Even in a case where the authentication is not executed at high security Level 3 since the Bluetooth-enabled device Dbt does not have the I/O ability to execute the user authentication using a PIN number, the user authentication is executed at the cellular telephone UE if the user authentication is necessary.

If the other device is a printer which does not comprise a display or a number input key, for example, Security Level 2 is set by the authentication executed with the initiative of the other device (printer), in step 3*c*. However, it is discriminated in step 3*g* that the user authentication is necessary since the other device is a printer or a printing service, and the user authentication is executed by employing user interfaces (operation unit 40 and display unit 60) of the cellular telephone UE in step 3*h*, and permission for execution of the service is obtained from the user.

Therefore, according to the cellular telephone UE, even in a case where the user authentication cannot be executed since the I/O ability of the other device is low, the user authentication is executed at the cellular telephone UE. Therefore, the high security level can be set, and the connectivity is not damaged while maintaining a necessary security level.

In the above-described embodiment, the information items (device information and ability information) of the other device are obtained on the basis of the FHS packet in step 3*b*. Instead of this, the information items may be obtained on the basis of, for example, EIR (Extended Inquiry Response) packet. Then, the necessity of the user authentication is discriminated by the security level setting unit 105, on the basis of these information items, in step 3*g*.

In addition, the type of service (type of application software) selected by the user by means of the operation unit 40 may be used as the information indicating the type of the service used in step 3*g*. As for the connection request activated by the action from the other service, the security level setting unit 105 may discriminate the security level on the basis of types of the action and the service to be activated.

It goes without saying that the present invention can also be variously modified within a scope which does not depart from the gist of the present invention.

Embodiment C

Bluetooth is built in various types of devices and often cannot use the authentication system accompanying the user confirmation. For example, cellular telephones render services requiring high security such as speech communications and data communications by Bluetooth, but the other devices at the time of employing speech communications are devices which comprise operation inputting means and displays such as car navigators and devices which do not comprise operation inputting means or displays such as headsets. At the devices which do not comprise input displaying means such as headsets, the authentication system accompanying the user confirmation cannot be employed.

For this reason, when the security is considered important, some devices cannot be connected. In addition, when the connectivity is considered important, sufficient security cannot be assured in some cases.

An embodiment of the present invention will be described below with reference to the accompanying drawings. A radio communication terminal is described as an example of a cellular telephone. However, the present invention is not limited to a cellular telephone, but can also be applied to a device (for example, a car navigation device, PC, etc.) which has a near field communication function and which is based on executing authentication at the time of establishing the connection of the near field communication.

Figure 10:
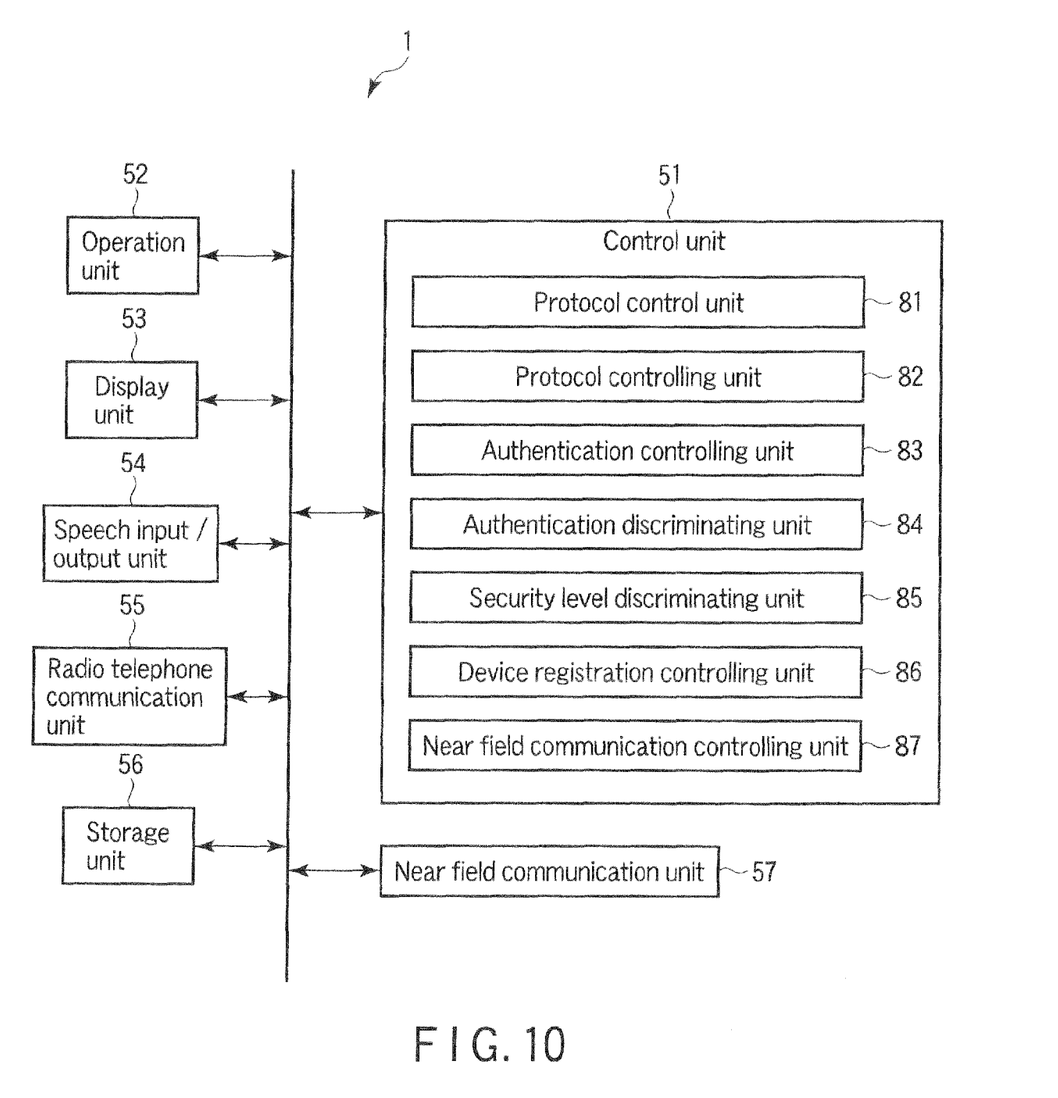
FIG. 10 is a block diagram showing a configuration of a cellular telephone according to an embodiment C of the present invention.

FIG. 10 is a block diagram showing a configuration of a cellular telephone according to the embodiment of the present invention. A cellular telephone 1 comprises a control unit 51, an operation unit 52, a display unit 53, a speech input/output unit 54, a radio telephone communication unit 55, a storage unit 56, and a near field communication unit 57.

The control unit 51 comprises CPU, ROM, RAM, etc. and executes control of the entire cellular telephone 1.

The operation unit 52 comprises operation keys or a touchpad, a touch panel, etc. and inputs signals responding to user operations to the control unit 51.

The display unit 53 is constituted by a liquid crystal display, organic EL display, etc. to display letters and characters, and images under control of the control unit 51.

The speech input/output unit 54 comprises a speaker and a microphone, and executes input and output of speech transmitted over communication by the radio telephone communication unit 55 and output of speech and music such as music content and moving image content, etc.

The radio telephone communication unit 55 executes speech communication and packet communication via the base station. For example, if speech is transmitted by the speech communication, the radio telephone communication unit 55 executes signal processing such as coding, error control, etc. for the speech data obtained by collecting the speech from the microphone of the speech input/output unit 54, and transmits the data obtained by the processing to the base station over a radio signal. In addition, the radio telephone communication unit 55 receives the radio signal from the base station and converts the radio signal into an electric signal. Then, the radio telephone communication unit 55 executes signal processing such as decoding, error correction, etc. for the electric signal, and outputs a speech signal thereby obtained from the speaker of the speech input/output unit 54.

The storage unit 56 stores various types of application software, information registered by the user, etc.

The near field communication unit 57 is constituted by a radio communication module which transmits and receives a radio signal of smaller transmission power than the radio telephone communication unit 55, such as Bluetooth, and executes radio communication with the other device. The following descriptions exemplify a case where the near field communication unit 57 executes Bluetooth connection.

The control unit 51 comprises a protocol control unit 81, a protocol controlling unit 82, an authentication controlling unit 83, an authentication discriminating unit 84, a security level discriminating unit 85, a device registration controlling unit 86, and a near field communication controlling unit 87.

The protocol control unit 81 controls a communication protocol to transmit the data in the near field communication. In other words, the protocol control unit 81 executes a function provided by Bluetooth Stack from Baseband to RFCOMM.

The protocol controlling unit 82 executes a defined procedure for each of services (profiles) in Bluetooth. The profiles are, for example, HFP (Hands-Free Profile) for implementing hands-free conversation, A2DP (Advanced Audio Distribution Profile) for transmitting speech, AVRCP (Audio/Video Remote Control Profile) for implementing a remote-controller function, etc.

The authentication controlling unit 83 executes authentication by using a public key, a device address, and a key calculated from the time information. The authentication procedures are defined under Bluetooth Core Spec such as Bluetooth Stack and Generic Access Profile.

The authentication discriminating unit 84 determines an authentication scheme from the security level which is set for the input display ability of the other device and each of the services (profiles), and executes the authentication procedures of the authentication controlling unit 83 in the determined authentication scheme.

The security level discriminating unit 85 maintains the security level set for each of the services (profiles). Then, in response to the inquiry from the authentication discriminating unit 84, the security level discriminating unit 85 notifies the authentication discriminating unit 84 of the security level which should be set for each of the services. The security levels maintained by the security level discriminating unit 85 include Security Level 2 and Security Level 3. Security Level 2 is a security level at which authentication can be executed in the authentication scheme not accommodating the user confirmation. Security Level 3 is a security level at which authentication is necessary in the authentication scheme accommodating the user confirmation.

For example, since a profile relating to speech communication such as HFP requires high security, the security level is set at "3". On the other hand, for example, OPP (Object Push Profile) is a profile capable of transmitting telephone directory data, and is not considered to require such a high quality since the user confirms the transmission destination upon transmitting the telephone directory data. For this reason, the security level may be set at "2" for such a profile not requiring the high security.

The device registration controlling unit 86 creates a link key for authentication with the other device and maintains the created link key in association with the device address.

The near field communication controlling unit 87 controls a baseband of near field communication executed by the near field communication unit 57.

Figure 11:
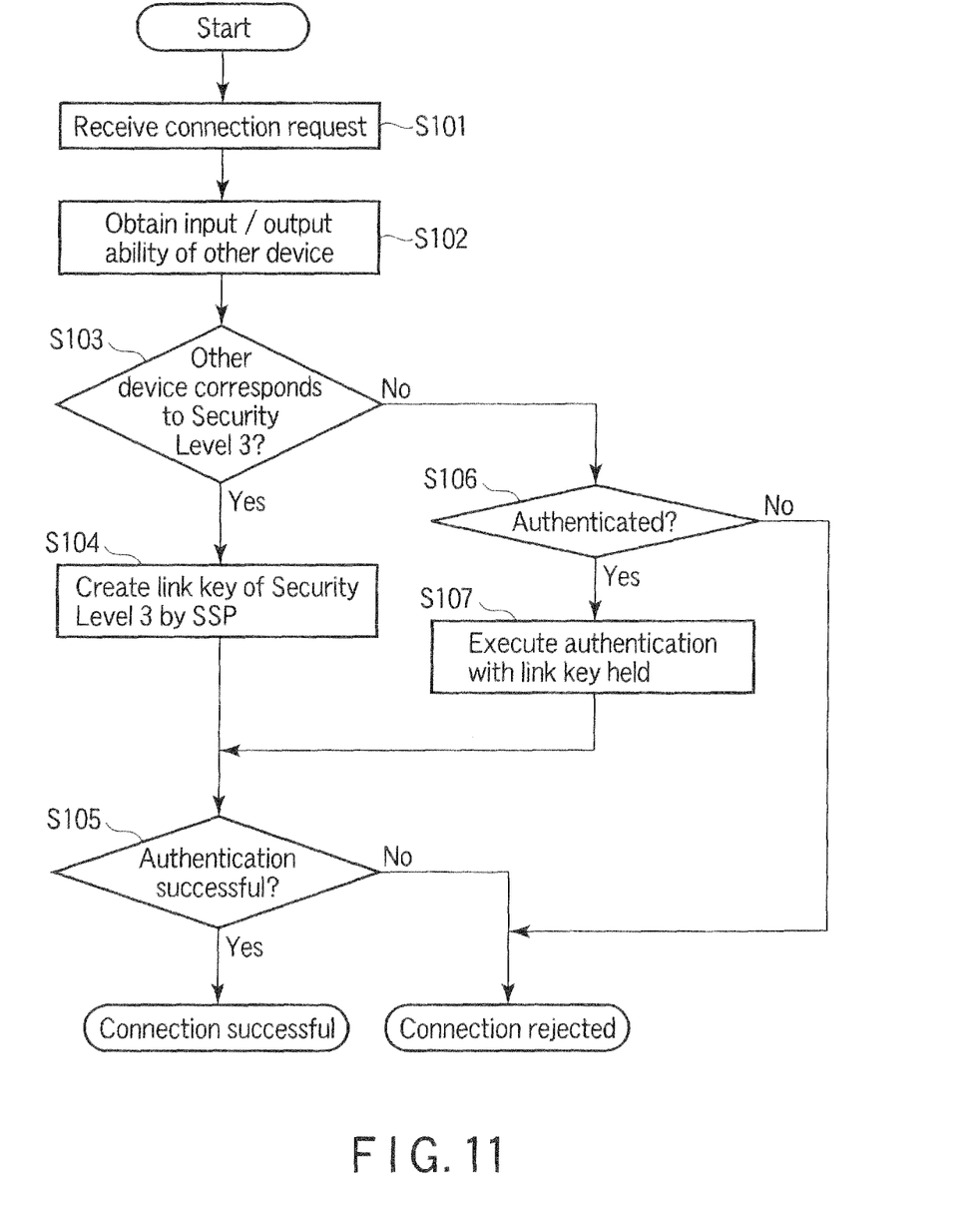
FIG. 11 is a flowchart showing processing in a case where the cellular telephone according to an embodiment C of the present invention accepts a connection request.

FIG. 11 is a flowchart showing processing in a case where the cellular telephone 1 receives a connection request.

This connection request is presumed as a connection request for the service which requires the authentication scheme of Security Level 3. If the cellular telephone 1 receives the connection request (S101), the authentication controlling unit 83 obtains the input/output ability of the other device (S102). The input/output ability of the other device is classified into ability in a case where displaying cannot be executed and inputting the numbers, Yes/No, etc. cannot be executed (hereinafter called I/O ability 1) and ability in the other case (hereinafter called I/O ability 2). If the other device has I/O ability 1, the cellular telephone 1 cannot correspond to the authentication scheme accompanying the user confirmation since the displaying or inputting cannot be executed. In other words, the cellular telephone 1 cannot correspond to Security Level 3.

For this reason, the authentication discriminating unit 84 discriminates whether the other device can correspond to Security Level 3 or not, in accordance with the input/output ability of the other device obtained in step S102 (S103). If the authentication discriminating unit 84 discriminates that the other device can correspond to Security Level 3 (Yes in S103), the authentication discriminating unit 84 determines the security level of the authentication at "3" and directs Security Level 3 to the security level discriminating unit 85. The security level discriminating unit 85 creates a link key of Security Level 3 in response to the determined security level, and executes the authentication using the link key (S104).

If the authentication discriminating unit 84 discriminates in step S103 that the other device cannot correspond to Security Level 3 (No in S103), the authentication discriminating unit 84 discriminates whether the other device has been registered or not (S106). If the other device has been registered, the device registration controlling unit 86 maintains the link key in association with the device address of the other device. Thus, the security level discriminating unit 85 executes the authentication by using the maintained link key (S107).

As described above, the authentication discriminating unit 84 discriminates the authentication scheme by using the information of the input display ability of the other device and the information as to whether the other device is an authenticated device or not. If the other device cannot correspond to Security Level 3 or is not an authenticated device, the security is maintained by rejecting the connection with the other device. If the other device can correspond to Security Level 3 and is an authenticated device, connection with the other device having I/O ability 1 at which displaying or inputting cannot be executed can also be implemented as much as possible by executing the authentication to make the connection possible.

In the flowchart of FIG. 11, it is discriminated in step S103 whether the other device can correspond to Security Level 3 or not and, if the other device cannot correspond to Security Level 3, it is discriminated in step S106 whether the other device has been authenticated or not. However, the order of step S103 and step S106 may be opposite.

Figure 12:
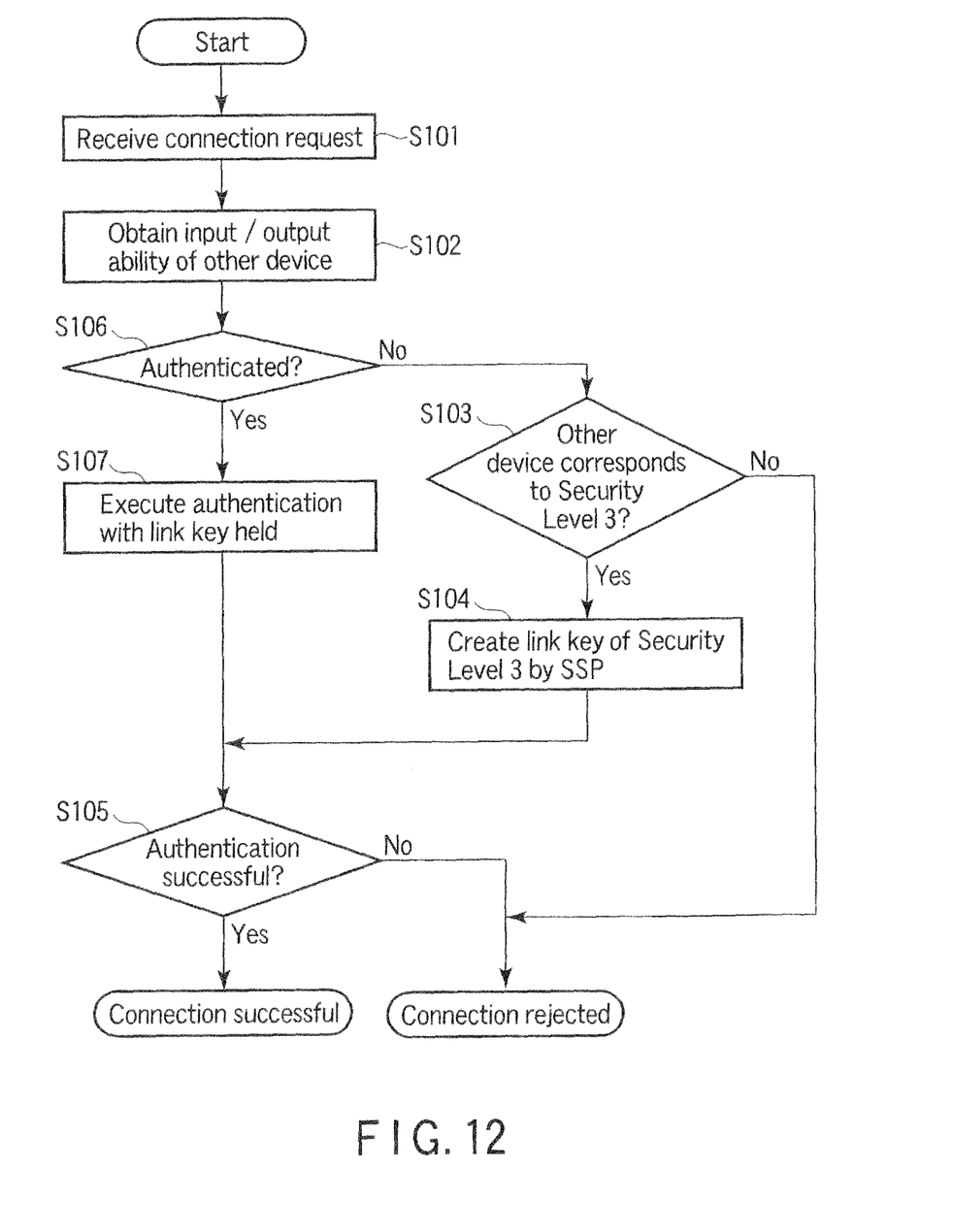
FIG. 12 is a flowchart showing processing in a case where the cellular telephone according to an embodiment C of the present invention accepts a connection request.

FIG. 12 is a flowchart showing processing in a case where step S106 is executed prior to step S103. In other words, in the flowchart of FIG. 12, the authentication discriminating unit 84 first executes the discrimination of step S106 and, executes the authentication using the link key maintained by the authentication controlling unit 83 if the other device is an authenticated device, or discriminates whether the other device can correspond to Security Level 3 or not if the other device is not an authenticated device, and the authentication controlling unit 83 creates the link key of Security Level 3 to execute the authentication if the other device can correspond to Security Level 3.

Figure 13:
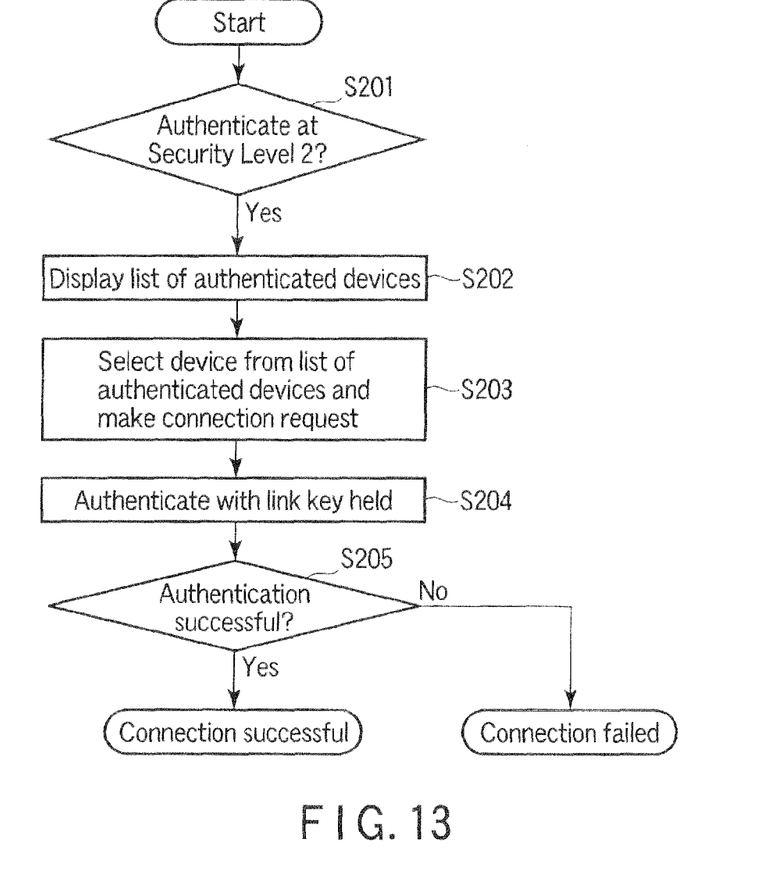
FIG. 13 is a flowchart showing processing in a case where the cellular telephone according to an embodiment C of the present invention makes a connection request.
Figure 14:
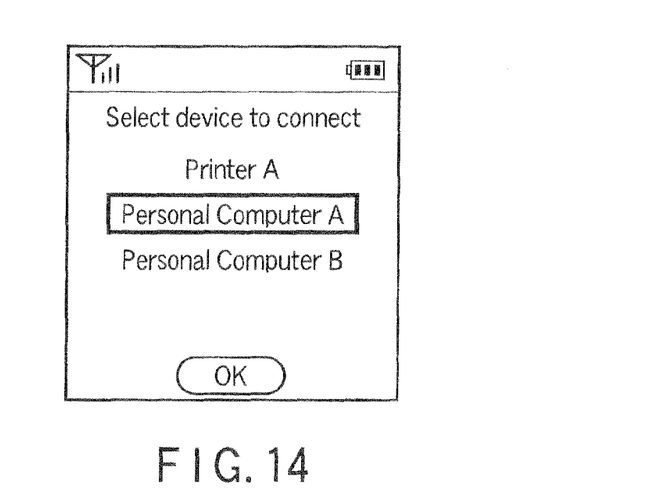
FIG. 14 is an illustration showing an example of a screen to be displayed on a screen in a case where the cellular telephone according to an embodiment C of the present invention makes a connection request.

FIG. 13 is a flowchart showing processing in a case where the cellular telephone 1 makes a request for connection to an arbitrary other device. The connection request is presumed as a connection request for a service which can be authenticated in the authentication scheme at Security Level 2. If the authentication discriminating unit 84 discriminates that the connection request accompanying the authentication at Security Level 2 is made, the authentication discriminating unit 84 reads the authenticated devices stored in the device registration controlling unit 86. The display unit 53 displays a list of the authenticated devices (S202). The list of the authenticated devices is displayed as shown in, for example, FIG. 14. In FIG. 14, information items of three authenticated devices "Printer A", "personal computer A" and "personal computer B" are displayed such that the user can select the device to which the user requests connection, by means of the operation unit 52, from the list of devices displayed on the display unit 53. If the operation unit 52 accepts the user's selection operation, the authentication discriminating unit 84 makes the request for connection to the selected other device (S203). The authentication discriminating unit 84 executes the authentication for establishment of connection by using the link key stored in the device registration controlling unit 86 (step S204).

Thus, if the authentication is executed in the authentication scheme not accompanying the user confirmation upon making the request for connection to the other device, the request for connection to the only authenticated device is made. If the authentication is executed in the authentication scheme not accompanying the user confirmation without user's selection of the device to which the request for connection is made, the user's confirmation operation is not executed during the process of authentication and the user would connect to a device to which the user does not intend to connect. In the processing shown in FIG. 13, however, connection to device which the user does not intend can be avoided by urging the user to select the device to which the user intends to make a request for connection. Furthermore, in the processing shown in FIG. 13, since the only authenticated device is displayed on the display unit 53 as the device to be selected, possibility of connecting to the device which the user does not intend due to the user's operation error can be reduced upon connecting to the other device by the authentication of a low security level.

According to the configuration of the above-described embodiment, the authentication scheme can be simplified as much as possible while maintaining the security upon making the request for connection or receiving the request for connection.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus for executing communication by establishing a communication link according to a security level with another device, the apparatus comprising:
   a setting unit configured to set the security level according to a type of a service;
   a first discriminating unit configured to discriminate whether the security level set by the setting unit is necessary for the communication with the other device, in accordance with a type of the other device;
   a first link establishing unit configured to establish the communication link, according to the security level set by the setting unit, with the other device if the first discriminating unit discriminates that the security level is necessary;
   a second discriminating unit configured to discriminate whether the other device supports a profile which is to be activated if the first discriminating unit does not discriminate that the security level is necessary; and
   a second link establishing unit configured to:
      suppress establishing the communication link with the other device if the second discriminating unit does not discriminate that the other device supports the profile, and
      lower the security level set by the setting unit and to establish the communication link, according to the lowered security level, with the other device if the second discriminating unit discriminate that the other device supports the profile.

2. The apparatus according to claim 1, wherein the setting unit obtains information of the type of the service from the other device and sets the security level in accordance with the obtained information.

3. The apparatus according to claim 1, wherein the setting unit sets the security level in accordance with the type of the service requested by a user.

4. A radio communication method for executing communication by establishing a communication link according to a security level with another device, the method comprising:
   setting a security level according to a type of a service;
   discriminating whether the security level set by the setting is necessary for the communication with the other device, in accordance with a type of the other device;
   establishing the communication link, according to the security level set by the setting, with the other device if it is discriminated by the discriminating that the security level is necessary;

discriminating whether the other device supports a profile which is to be activated if the security level is not discriminated to be necessary;

suppressing establishing the communication link with the other device if the other device is not discriminated to support the profile, and lowering the security level set by the setting and establishing the communication link, according to the lowered security level, with the other device if it is discriminated that the other device supports the profile.

5. A radio communication apparatus for executing communication by establishing a communication link according to a security level with another device, the apparatus comprising:

an authenticating unit configured to execute authentication according to the security level set by the other device;

a discriminating unit configured to discriminate whether user approval is necessary or not at the radio communication apparatus, in accordance with a type of the other device, if the authentication by the authenticating unit is successful in a case in which the authentication executed by the authenticating unit is not authentication including confirmation executed by a user; and a link establishing unit configured to establish the communication link with the other device if the discriminating unit discriminates that the user approval is necessary, and configured to display an inquiry as to whether the user intends to connect to the other device of not and to accept a direction to permit connection with the other device from the user and to establish the communication link with the other device if the discriminating unit discriminates that the user approval is necessary.

6. A radio communication apparatus for executing communication by establishing a communication link according to a security level with another device, the apparatus comprising:

an authenticating unit configured to execute authentication according to the security level set by the other device;

a discriminating unit configured to discriminate whether user approval is necessary or not at the radio communication apparatus, in accordance with a type of a service, if the authentication by the authenticating unit is successful in a case in which the authentication executed by the authenticating unit is not authentication including confirmation executed by a user; and a link establishing unit configured to establish the communication link with the other device if the discriminating unit discriminates that the user approval is necessary, and configured display an inquiry as to whether the user intends to connect to the other device of not and to accept a direction to permit connection with the other device from the user and to establish the communication link with the other device if the discriminating unit discriminates that the user approval is necessary.

7. A radio communication method for executing communication by establishing a communication link according to a security level with another device, the method comprising:

executing authentication according to the security level set by the other device;

discriminating whether user approval is necessary or not, in accordance with a type of the other device, if the authentication is successful in a case in which the authentication is not authentication including confirmation executed by a user; and establishing the communication link with the other device if it is discriminated by the discriminating that the user approval is necessary, displaying an inquiry as to whether the user intends to connect to the other device of not, and accepting a direction to permit connection with the other device from the user and establishing the communication link with the other device if it is discriminated by the discriminating that the user approval is necessary.

8. A radio communication method for executing communication by establishing a communication link according to a security level with another device, the method comprising:

executing authentication according to the security level set by the other device;

discriminating whether user approval is necessary or not, in accordance with a type of service, if the authentication is successful in a case in which the authentication is not authentication including confirmation executed by a user; and establishing the communication link with the other device if it is discriminated by the discriminating that the user approval is necessary, displaying an inquiry as to whether the user intends to connect to the other device of not, and accepting a direction to permit connection with the other device from the user and establishing the communication link with the other device if it is discriminated by the discriminating that the user approval is necessary.

* * * * *